United States Patent
Dell'Amico et al.

(10) Patent No.: US 10,547,633 B1
(45) Date of Patent: Jan. 28, 2020

(54) SYSTEMS AND METHODS FOR MAPPING SERVICES UTILIZED BY NETWORK DOMAINS

(71) Applicant: Symantec Corporation, Mountain View, CA (US)

(72) Inventors: Matteo Dell'Amico, Biot (FR); Pierre-Antoine Vervier, Biot (FR); Leylya Yumer, Biot (FR)

(73) Assignee: Symantec Corporation, Mountain View, CA (US)

( * ) Notice: Subject to any disclaimer, the term of this patent is extended or adjusted under 35 U.S.C. 154(b) by 147 days.

(21) Appl. No.: 15/805,160

(22) Filed: Nov. 7, 2017

(51) Int. Cl.
 *H04L 29/06* (2006.01)
 *H04L 12/24* (2006.01)

(52) U.S. Cl.
 CPC ........ *H04L 63/1433* (2013.01); *H04L 41/024* (2013.01); *H04L 41/0226* (2013.01)

(58) Field of Classification Search
 None
 See application file for complete search history.

(56) References Cited

U.S. PATENT DOCUMENTS

| | | | | |
|---|---|---|---|---|
| 9,215,158 B1* | 12/2015 | Adogla | ............. | H04L 29/08144 |
| 2008/0222287 A1* | 9/2008 | Bahl | ........................ | H04L 41/12 |
| | | | | 709/224 |
| 2012/0041899 A1* | 2/2012 | Greene | ................... | G06Q 10/04 |
| | | | | 705/400 |
| 2013/0298230 A1* | 11/2013 | Kumar | .................... | G06F 21/52 |
| | | | | 726/22 |
| 2013/0339204 A1* | 12/2013 | Dias De Assuncao | ...................... |  |
| | | | | H04L 67/1097 |
| | | | | 705/35 |
| 2017/0185927 A1* | 6/2017 | Curcic | ............... | G06Q 10/0635 |
| 2018/0146004 A1* | 5/2018 | Belfiore, Jr. | .......... | G06F 21/577 |

OTHER PUBLICATIONS

Anouar Adlani; http://anouar.adlani.com/2011/12/useful-dig-command-to-troubleshot-your-domains.html; Dec. 21, 2011.
Brian Krebs; https://krebsonsecurity.com/2016/10/ddos-on-dyn-impacts-twitter-spotify-reddit/; Oct. 21, 2016.
Darrell Etherington; https://techcrunch.com/2017/02/28/amazon-aws-s3-outage-is-breaking-things-for-a-lot-of-websites-and-apps/; Feb. 28, 2017.

(Continued)

*Primary Examiner* — Philip J Chea
*Assistant Examiner* — Hassan A Khan
(74) *Attorney, Agent, or Firm* — FisherBroyles, LLP

(57) ABSTRACT

The disclosed computer-implemented method for mapping services utilized by network domains may include (i) receiving a request to perform a risk assessment on a domain, (ii) querying a database for records associated with the domain, where each record links to a network resource that enables functionality of the domain, (iii) generating a service map that matches each network resource to a corresponding service type and service provider, (v) performing the risk assessment of the domain, and (vi) facilitating a security measure for the domain based on a result of the risk assessment. Various other methods, systems, and computer-readable media are also disclosed.

20 Claims, 8 Drawing Sheets

(56) References Cited

OTHER PUBLICATIONS

Dell'Amico, et. al; Lean On Me: Mining Internet Service Dependencies from Large-Scale DNS Data.
Google, Inc; https://github.com/WPO-Foundation/webpagetest/blob/master/agent/wpthook/cdn.h; 2011.
Pierluigi Paganini; http://securityaffairs.co/wordpress/51640/cyber-crime/tbps-ddos-attack.html; Sep. 25, 2016.

* cited by examiner

SYSTEMS AND METHODS FOR MAPPING SERVICES UTILIZED BY NETWORK DOMAINS

BACKGROUND

As the Internet grows in everyday importance, websites and organizations that maintain a digital presence increasingly rely on third-party IT services and/or infrastructure for a variety of functions. IT service vendors are generally referred to by the type of service and/or infrastructure that they provide. Examples of service vendor types include, for example, content distribution networks (CDNs), hosting, mail service providers, and/or cloud services. These service vendors offer clients an advantage in that the service vendor manages the costs of setting up, maintaining, and securing these services. Moreover, various services may enable the functioning of an organization's network domain (e.g., google.com is a domain managed by and representing the company, GOOGLE).

Unfortunately, customers may be largely or even completely reliant on a vendor for certain services. Moreover, certain vendors may be responsible for providing services to a very large number of clients, and service outages in the vendor's systems (e.g., due to a cyberattack) may cause clients of the service vendor to in turn be unable to provide services to their customers. Insurance and/or risk-assessment companies may attempt to mitigate the damage caused by such service failures, but may be unable to do so in an efficient manner without a complete picture of the various services that a particular domain utilizes as part of its normal function. The instant disclosure, therefore, identifies and addresses a need for systems and methods for mapping services utilized by network domains.

SUMMARY

As will be described in greater detail below, the instant disclosure describes various systems and methods for mapping services utilized by network domains. In one example, a computer-implemented method for mapping services utilized by network domains may include (i) receiving a request to perform a risk assessment on a domain, (ii) querying a database for a group of records associated with the domain, wherein each record links to a network resource that enables functionality of the domain, (iii) generating a service map that matches each network resource used by the domain to the service type of the network resource and the service provider that provides the network resource, (iv) performing, in response to receiving the request, the risk assessment of the domain based at least in part on the service, and (v) facilitating a security measure for the domain based at least in part on a result of the risk assessment. In some examples, the risk assessment may be performed to determine a likelihood that the domain experiences a failure.

The above-described method may facilitate the security measure in a variety of ways. For example, facilitating the security measure may include providing a result of the risk assessment that includes the service map to a security provider that provides network security services for the domain. Providing the result of the risk assessment to the security provider may enable the security provider to protect the domain against service outages caused by failures in one or more service providers to the domain.

The computer-implemented method may optionally include generating multiple service maps. For example, the computer-implemented method may further include generating a group of service maps for the domain over a period of time. In this example, performing the risk assessment may include calculating, based on the group of service maps, a risk trajectory of the domain that represents a change over time in a potential impact on the domain that results from a potential failure in at least one network resource that enables functionality of the domain.

Additionally or alternatively, the computer-implemented method may further include generating a group of service maps that may include a corresponding service map for each domain in a group of domains. In such an embodiment, the computer-implemented method may also include identifying domains in the domains that utilize a particular network resource that is provided by a particular service provider, and performing the risk assessment may include performing the risk assessment on the particular service provider to evaluate a potential impact on the domains that would result from a service failure in the particular service provider.

In some embodiments, the computer-implemented method may include querying the database for a plurality of subdomain records associated with a subdomain of the domain, wherein each subdomain record links to a subdomain network resource that enables functionality of the subdomain. In these embodiments, generating the service map may include matching each subdomain network resource to a service type of the subdomain network resource and a service provider that provides the subdomain network resource such that each subdomain network resource is represented in the service map of the domain.

In some embodiments, the database may be a Domain Name System (DNS) database. Additionally or alternatively, the computer-implemented method may include examining cached or otherwise previously collected DNS queries and/or query logs. For example, the database may include a group of cached results from DNS queries that were performed over a specified period of time.

Generating the service map may include translating addresses associated with a retrieved record. In some examples, translating the record may include: (i) identifying an Internet Protocol address associated with a particular record, (ii) converting the Internet Protocol address into a corresponding domain, and (iii) translating the record based at least in part on the corresponding domain. Additionally or alternatively, translating the record may include: (i) identifying a domain associated with the record, (ii) converting the domain associated with the record into a corresponding Internet Protocol address, (iii) converting the Internet Protocol address into an additional domain, and (iv) translating the record based at least in part on the additional domain.

The above-described method may include methods of handling service providers that have not previously been categorized. In one embodiment, the computer-implemented method may include determining that the service type of the network resource is unknown and categorizing the service type of the network resource as unknown. In such an embodiment, the computer-implemented method may include compiling a list of uncategorized service providers based at least in part on identifying each record that corresponds to a network resource that has been categorized with a service type of unknown, and providing the list of uncategorized service providers to an administrator to enable the administrator to categorize each service provider in the list of uncategorized service providers.

In one embodiment, a system for implementing the above-described method may include (i) a receiving module, stored in a memory of the system, that receives a request to perform a risk assessment on a domain, (ii) a querying module, stored in the memory, that queries a database for a group of records associated with the domain, wherein each record in the group of records links to a network resource that enables functionality of the domain, (iii) a generating module, stored in the memory, that generates a service map that matches each network resource used by the domain to a service type of the network resource and a service provider that provides the network resource, (iv) a performing module, stored in memory, that performs the risk assessment of the domain in response to the request and based at least in part on the service map, (v) a facilitating module, stored in the memory, that facilitates a security measure for the domain based at least in part on a result of the risk assessment, and (vi) at least one physical processor configured to execute the receiving module, the querying module, the generating module, the performing module, and the facilitating module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) receive a request to perform a risk assessment on a domain, (ii) query a database for a group of records associated with the domain, wherein each record in the records links to a network resource that enables functionality of the domain, (iii) generate a service map that matches each network resource used by the domain to a service type of the network resource and a service provider that provides the network resource, (iv) perform the risk assessment of the domain based at least in part on the service map, and (v) facilitate a security measure for the domain based at least in part on a result of the risk assessment.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
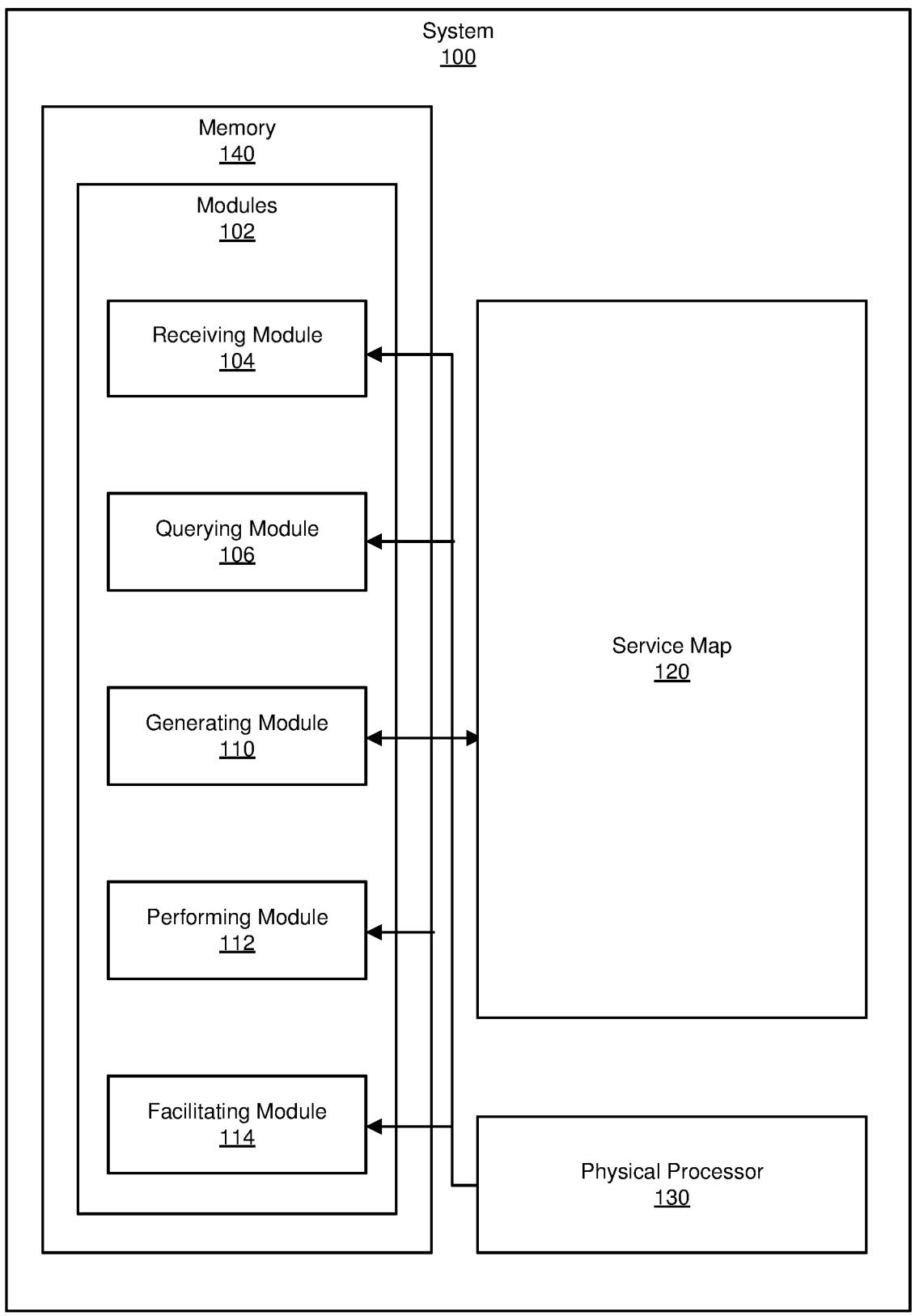
FIG. 1 is a block diagram of an example system for mapping services utilized by network domains.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for mapping services utilized by network domains. As will be described in greater detail below, by translating and analyzing records associated with a network domain, the systems and methods described herein may be able to identify various systems and service providers that allow the domain to function, even if those service providers have not been previously identified. Once these service providers have been identified, the systems and methods described herein may then be able to analyze the domain's dependencies to determine a risk of failure in the domain and to evaluate the expected severity of such a failure. Additionally or alternatively, the systems and methods described herein may enable administrators, insurers, etc. to review previously unidentified service providers that enable the functionality of a domain. By combining searches of both cached DNS query results and live DNS systems in addition to providing for analysis of previously uncategorized service providers, the systems and methods described herein may be able to effectively map out the services that enable a domain. Furthermore, mapping the interdependencies between networked services may allow the systems and methods described herein to chart out potential failure cascades that may be important to security providers and/or insurance organizations.

Moreover, the systems and methods described herein may improve the functioning of a network by identifying critical services that enable large sections of the network. For example, GOOGLE and AMAZON are both service providers that enable large swaths of the Internet. Failures in less well-known service providers may also have far-reaching consequences. Once these key service providers have been identified, business continuity systems and/or security systems may perform operations to provide high availability and/or increased security in the case of failure. In addition, network administrators may have the information necessary to protect their systems against service outages. These systems and methods may also benefit insurance providers by allowing insurers to properly evaluate the risks and potential costs associated with offering failure insurance to a domain and/or service provider.

Figure 2:
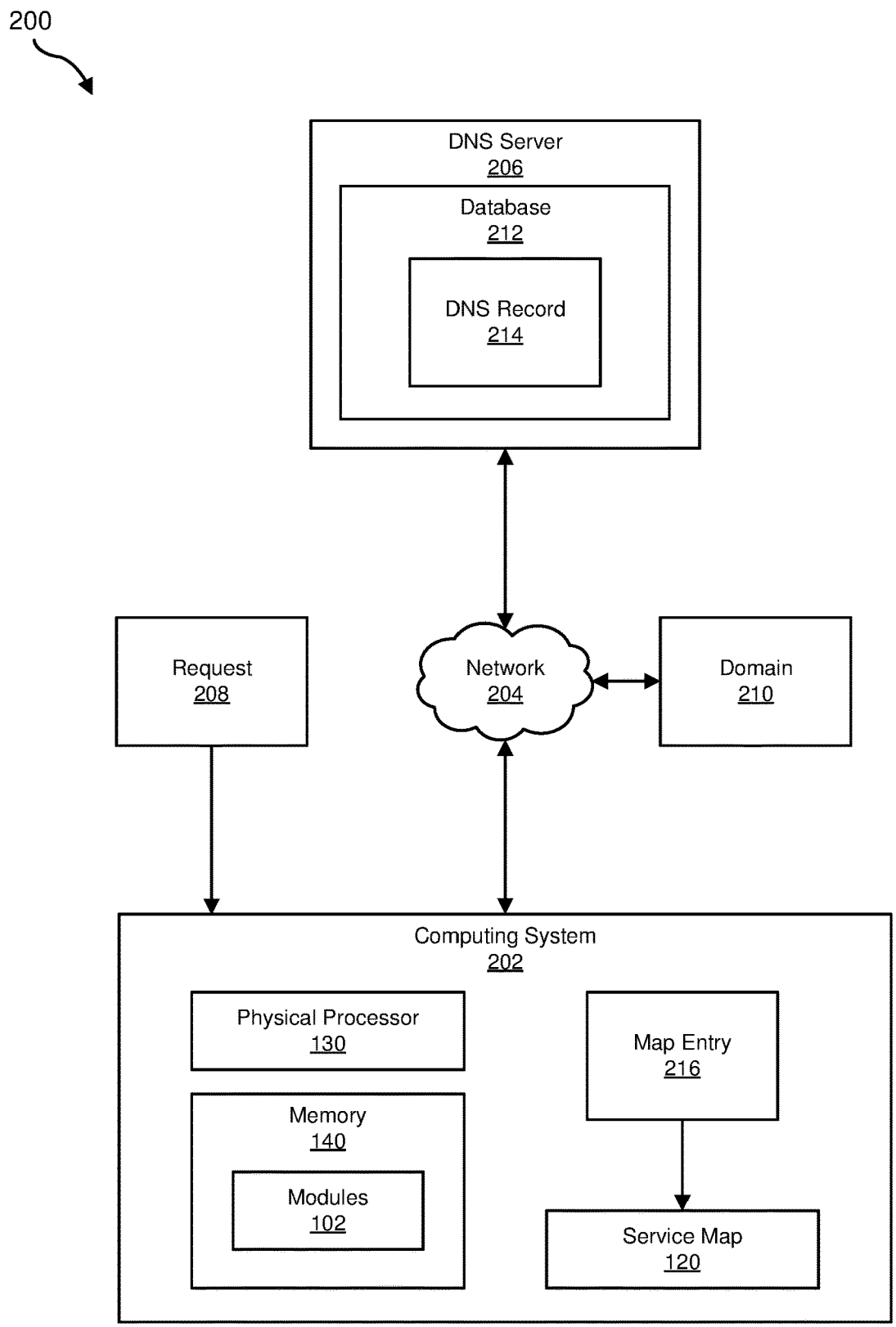
FIG. 2 is a block diagram of an additional example system for mapping services utilized by network domains.

The following will provide, with reference to FIGS. 1-2, detailed descriptions of example systems for mapping services utilized by network domains. Detailed descriptions of corresponding computer-implemented methods will also be provided in connection with FIG. 3. Detailed descriptions of how system interdependencies may lead to cascading failures will be provided in connection with FIG. 4. Detailed descriptions of an example system that leverages both active DNS queries and cached DNS query results will be provided in connection with FIG. 5, and detailed descriptions of example methods for generating a service map will be provided in connection with FIG. 6. In addition, detailed descriptions of an example computing system and network architecture capable of implementing one or more of the embodiments described herein will be provided in connection with FIGS. 7 and 8, respectively.

FIG. 1 is a block diagram of example system 100 for mapping services utilized by network domains. As illustrated in this figure, example system 100 may include one or more modules 102 for performing one or more tasks. For example, and as will be explained in greater detail below, example system 100 may include a receiving module 104 that receives a request to perform a risk assessment on a domain. Example system 100 may additionally include a querying module 106 that queries a database for records associated with the domain. Each record may link to a network resource that enables functionality of the domain. Example system 100 may also include a generating module 110 that generates, based on the map entries, a service map that matches each network resource used by the domain to a service type of the network resource and a service provider that provides the network resource. Example system 100 may further include a performing module 112 that performs the risk assessment of the domain based at least in part on the service map. Example system 100 may additionally include a facilitating module 114 that facilitates a security measure for the domain based at least in part on a result of the risk assessment. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing system 202). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate mapping services utilized by network domains. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

Moreover, example system 100 may generate one or more service maps, such as service map 120 in FIG. 1. Service map 120 generally represents any database or other suitable data structure that is capable of storing map entries (e.g., map entry 216 in FIG. 2) that link a service provider to a type of service provided by that service provider. For example, a map entry corresponding to the service provider GOOGLE acting as a content distribution network may read "(CDN) GOOGLE." Depending on the context in which service map 120 is generated, map entries in service map 120 may contain a variety of other information. For example, a service map created to evaluate a service provider may include entries for various services offered by the provider in conjunction with counters that indicate how many clients rely on the service provider for that service. As a specific example of this embodiment, a map entry in a service map created to perform a risk assessment for services offered by AMAZON may read "(CLOUD: IAAS) Amazon Elastic Compute Cloud: 174788," indicating that 174788 client systems rely on AMAZON ELASTIC COMPUTE CLOUD for cloud-based Infrastructure-as-a-Service (IAAS) functions. Map entries may also mark service providers as providing unknown and/or uncategorized services, as will be described in greater detail below.

Example system 100 in FIG. 1 may be implemented in a variety of ways. For example, all or a portion of example system 100 may represent portions of example system 200 in FIG. 2. As shown in FIG. 2, system 200 may include a computing system 202 in communication with a DNS server 206 via a network 204. In one example, all or a portion of the functionality of modules 102 may be performed by computing system 202, DNS server 206, and/or any other suitable computing system. As will be described in greater detail below, one or more of modules 102 from FIG. 1 may, when executed by at least one processor of computing system 202, enable computing system 202 to determine how failures of upstream service providers might affect a network domain. For example, and as will be described in greater detail below, receiving module 104 may receive a request 208 to perform a risk assessment on a domain 210. Querying module 106 may query, in response to request 208, a database 212 for records associated with domain 210, wherein each record links to a network resource that enables functionality of domain 210. In the example of FIG. 2, querying module 106 retrieves a single record, illustrated as DNS record 214. Generating module 110 may generate a service map 120 that matches each network resource used by domain 210 to the service type of network resource and the service provider that provides network resource. Performing module 112 may perform the risk assessment of domain 210 based at least in part on service map 120. Facilitating module 114 may facilitate a security measure for domain 210 based at least in part on a result of the risk assessment.

Computing system 202 generally represents any type or form of computing device, combination of computing devices, and/or computing systems capable of reading computer-executable instructions. In general, computing system 202 may be capable of connecting to and querying databases that contain DNS information, such as a live DNS lookup system that retrieves current DNS records and/or a DNS query cache that contains results from previous DNS queries. In some embodiments, the systems and methods described herein may retrieve and analyze large quantities of data that would take a single computing device a prohibitive amount of time to process. In these embodiments, computing system 202 may represent a computing system and/or computing cluster composed of many networked computing devices acting in concert to execute the systems and methods described herein.

DNS server 206 generally represents any computing system that contains a database of public Internet Protocol (IP) addresses and any corresponding hostnames or domains. For example, DNS server 206 may maintain a database (e.g., database 212 in FIG. 2) populated with "A" (Address) records that link hostnames and/or fully-qualified domain names (FQDNs) to IP addresses. Similarly, DNS server 206 may maintain database entries, sometimes called records, linking hostnames to services that enable content served by the domain that corresponds to the hostname. For example, DNS server 206 may maintain records linking a domain to a mail-exchange service in an "MX" (Mail eXchange) record for the domain. In many cases, a DNS server may act to resolve or translate hostnames, mail links, and/or Uniform Resource Locator (URL) links into IP addresses using these records. DNS servers may additionally or alternatively be referred to as name servers. Although illustrated as a single entity in FIG. 2, DNS server 206 may include and/or represent a group of servers that work and/or operate in conjunction with one another.

Network 204 generally represents any medium or architecture capable of facilitating communication or data transfer. In one example, network 204 may facilitate communication between computing system 202 and DNS server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Domain 210 generally represents a segment of a network (e.g., network 204) that functions as a single logical unit to provide a function and/or service to users that access the domain. For example, a domain may host a webpage, mail services, infrastructure services, combinations of one or more of the same, and/or any other suitable service that may be provided over a network. Domains may use a variety of support systems and/or infrastructure as part of providing the intended functions and/or services. For example, a domain may use a third-party service for e-mail handling, content delivery, etc. These services may be recorded at a DNS server. Furthermore, while network protocols may require an IP address to connect a computing device to a domain, domains may additionally be referred to by domain names for human ease-of-use. Domain names may, in turn, be translated into a IP address by a DNS server using an A record. Furthermore, domains may include subdomains. For example, ".com" is a top-level domain, with "amazon.com" being a subdomain of the ".com" domain. A FQDN that an end-user might use to interact with the AMAZON online marketplace may include a further subdomain to yield the FQDN, "smile.name.amazon.com."

Map entry 216 generally represents any type or form of data structure that may be used to link an identifier of a service provider (e.g., a FQDN) to services offered by that provider. As will be described in greater detail above in connection with service map 120, map entry 216 may optionally link a service provider to a variety of other information, such as the number of systems and/or domains known to use that service provider.

Figure 3:
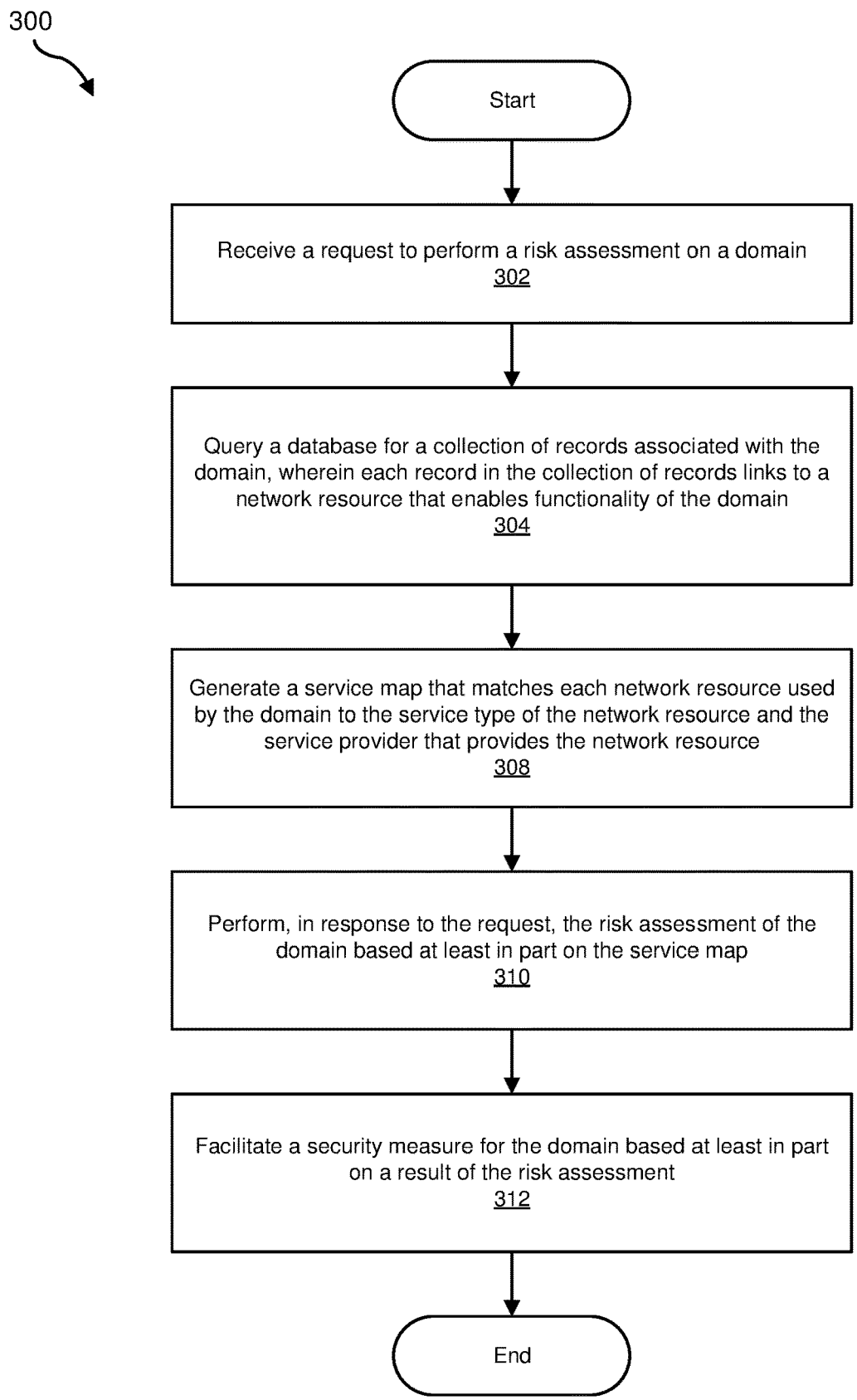
FIG. 3 is a flow diagram of an example method for mapping services utilized by network domains.

FIG. 3 is a flow diagram of an example computer-implemented method 300 for mapping services utilized by network domains. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may receive a request to perform a risk assessment on a domain. For example, receiving module 104 may, as part of computing system 202 in FIG. 2, receive request 208 to perform a risk assessment on domain 210.

Receiving module 104 may receive request 208 in a variety of contexts. In some embodiments, receiving module 104 may function as part of an automated system that routinely evaluates domains that subscribe to a risk-assessment service. In these embodiments, request 208 may represent the automated system performing a routine evaluation. In further embodiments, receiving module 104 may execute as part of a system that provides risk evaluations to prospective insurance and/or security providers that are considering providing services to the owner of a domain. In these embodiments, request 208 may represent an electronic request delivered, for example, over an online system and/or a manual entry on the part of an operator of the evaluation system.

In some embodiments, receiving module 104 may receive a request to perform a risk assessment on domain 210 to determine a likelihood that domain 210 experiences a failure. For example, receiving module 104 may execute as part of a risk-assessment system that evaluates the importance of a particular service provider. As will be described in greater detail below, many client systems may depend on a service provider in order to function. Accordingly, the systems and methods described herein may evaluate scenarios in which the service provider is rendered incapable of providing its usual services and evaluate the expected severity of such a service outage.

Figure 4:
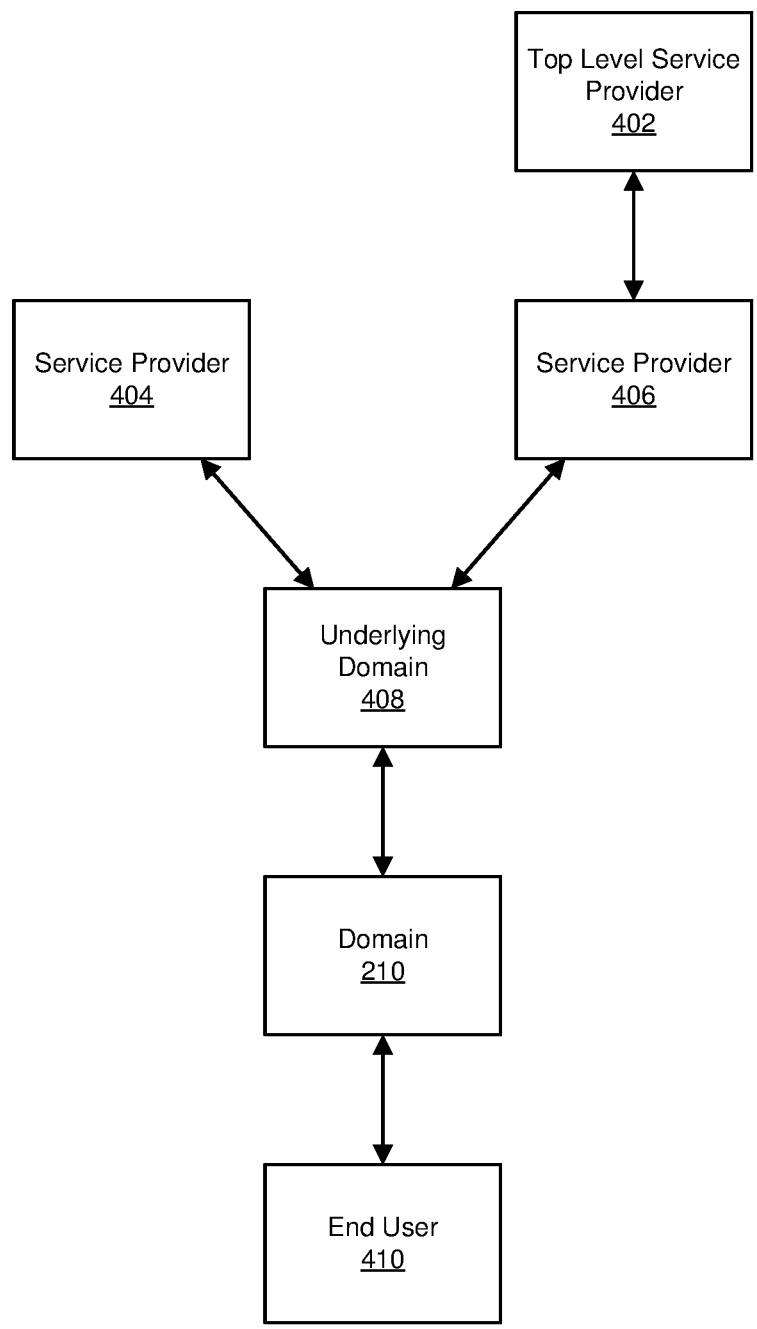
FIG. 4 is a block diagram of an example series of dependencies that facilitate the functioning of a domain.

A risk assessment and/or service map of domain 210 may account for system dependencies that enable domain 210 to function. An illustrated example of system dependencies is shown in FIG. 4. As illustrated in FIG. 4, domain 210 may provide services (e.g., host a webpage) to end user 410. To accomplish this task, domain 210 may rely on services and/or infrastructure provided by an underlying domain 408. Underlying domain 408 may represent a content delivery network (CDN), and be represented under a CNAME entry in a DNS record associated with domain 210. Going further, underlying domain 408 may in turn rely on services and/or infrastructure provided by other service providers, illustrated as service providers 404 and 406. For example, service provider 404 may represent a name server that provides domain-to-IP address mappings, allowing systems (e.g., web browsers) used by end user 410 properly resolve. In this example, the name server represented by service provider 404 may be associated with an NS entry in a DNS record associated with underlying domain 408. Similarly, these service providers may in turn rely on other service providers. For example, service provider 406 relies on yet another service provider, illustrated as top level service provider 402. As may be appreciated from this example, a failure in any of the service providers above domain 210 may cause failures to cascade down the chain and ultimately impact domain 210. As a specific example, a failure in top level service provider 402 may cause a failure in service provider 406, which may in turn cause a failure in underlying domain 408 which will cascade into a failure at domain 210. The systems and methods described herein may be able to map out these dependencies and identify potential points of failure that may potentially impact domain 210.

Regardless of the context within which receiving module 104 receives request 208, receiving module 104, request 208 may include requests to evaluate multiple domains. For example, a large-scale evaluation of interdependencies between service providers and domains may evaluate the dependencies of one million domains. Various elements of modules 102 may select these domains based on a variety of factors, such as popularity (e.g., the AMAZON ALEXA 1M data set) and/or based on manual operator input (e.g., to ensure that a particular domain is included in the risk assessment).

At step 304 in FIG. 3, one or more of the systems described herein may query, in response to the request, a database for records associated with the domain, wherein each record links to a network resource that enables functionality of the domain. For example, querying module 106 may, as part of computing system 202 in FIG. 2, query, in response to request 208, a database 212 maintained by DNS server 206 for records associated with domain 210, such as DNS record 214. DNS record 214 contains information that links to a network resource that enables functionality of domain 210.

Querying module 106 may query a variety of systems as part of retrieving DNS record 214. For example, querying module 106 may directly query a live DNS database and/or a live DNS server to retrieve records relating to a current state of domain 210. Querying module 106 may use a variety of operations to query the live DNS server. In general, querying module 106 may attempt to retrieve as many records from DNS server 206 as possible using any available techniques, including but not limited to 'dig' operations. Querying a live DNS server such as DNS server 206 may enable querying module 106 to discover and retrieve DNS records that other systems generally do not search for (and therefore would not be saved in a query cache), thereby allowing the systems and methods described herein to obtain a complete overview of the service providers that enable domain 210.

Additionally or alternatively, querying module 106 may search a database that includes cached results from DNS queries that were performed over a specified period of time. For example, querying module 106 may retrieve cached DNS queries relating to domain 210 that were cached within the past month. Querying module 106 may use cached DNS queries for a variety of reasons. For example, certain records (e.g., NS records) may be unlikely to change over time, thus allowing certain cached records to serve as a viable approximation of the live DNS configuration for the domain. Using these cached records may thereby allow the systems and methods described herein to analyze large volumes of data while minimizing the overhead associated with querying a live DNS system.

Leveraging cached queries collected over a period of time may also allow the systems and methods described herein to track the risk trajectory of domains and/or service providers. Such risk-trajectory analysis may enable administrators, insurance companies, and/or security organizations to determine whether a domain is becoming more or less risky to operate. Similarly, risk-trajectory analysis of this nature may allow administrators, insurance companies, and/or security organizations to determine how essential a service provider is in terms of keeping as many client services functioning as possible.

Furthermore, these cached queries may represent a more readily accessible source of data that is less likely to negatively impact a DNS network and/or be interpreted as an attack upon the DNS network, especially in cases where the systems and methods described herein evaluate very large numbers of domains as part of a wide-scale risk assessment. For example, a risk-assessment provider may passively cache DNS query logs over a period of time and use the cached queries as an input to an instance of the systems and methods described herein that executes on a data center owned by the risk-assessment provider, thereby reducing overhead costs such as data-transfer times.

Figure 5:
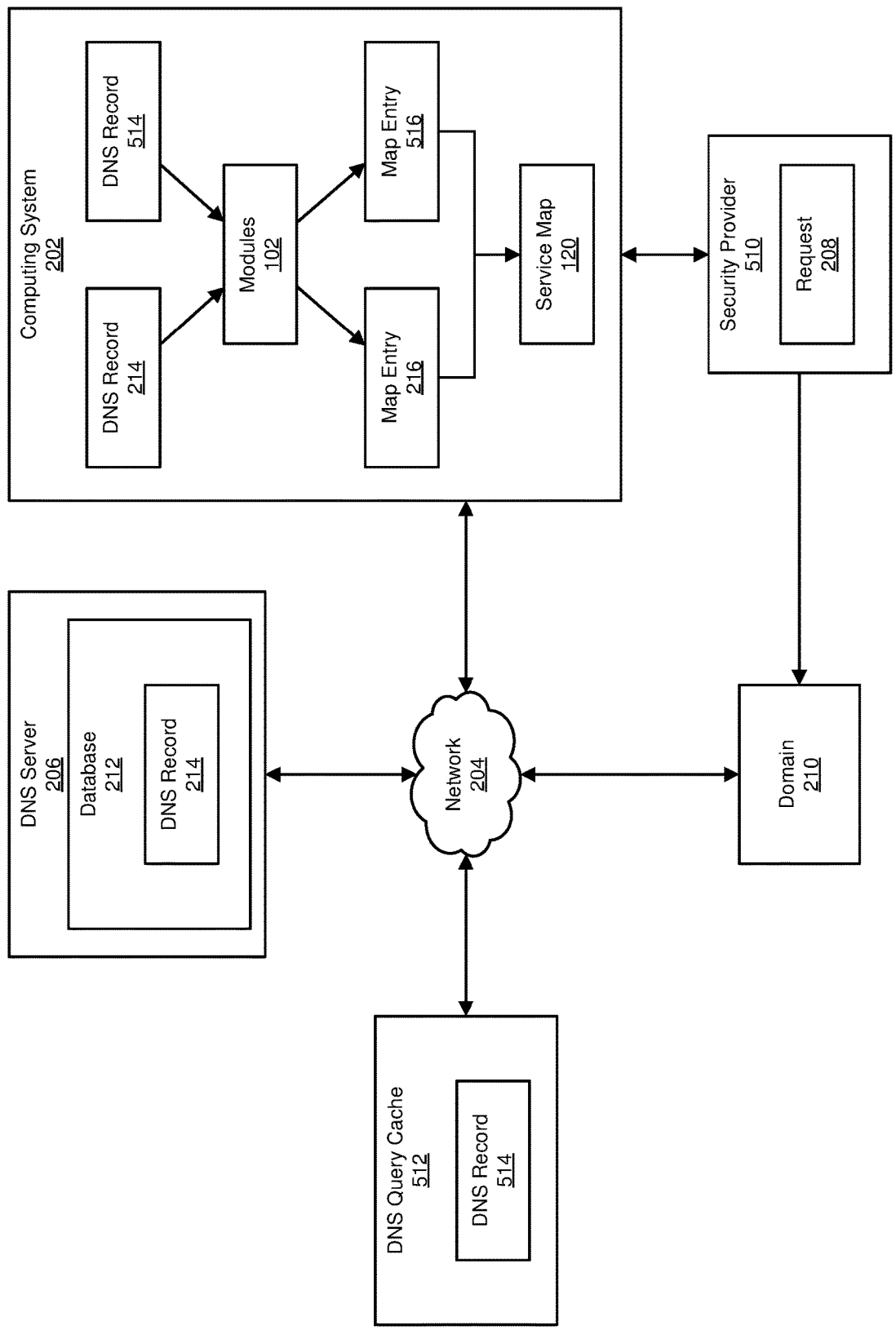
FIG. 5 is a block diagram of an example computing system for mapping services utilized by network domains that queries a live DNS server and a DNS query cache.

An example system that queries both a live DNS server and a cache of DNS query results is shown in FIG. 5. As illustrated in FIG. 5, modules 102 may execute on computing system 202, and be in communication with domain 210, DNS server 206, and a DNS query cache 512 via a network 204. Computing system 202 may also be in communication with or be owned by a security provider 510 that secures domain 210 against service failures.

DNS query cache 512 generally represents any type or form of database and/or other data storage structure that is capable of recording the results of a query to a live DNS system (e.g., DNS server 206). DNS query cache 512 may store these results in any suitable format and/or directly as reported from the live DNS system. For the sake of simplicity, FIG. 5 illustrates a cached query result as DNS record 514, as modules 102 ultimately use the various types and/or forms of information acquired from a DNS server record and from a cached query result in the same general fashion regardless of the format of the data. DNS query cache 512 may be operated by the same organization that operates computing system 202. Alternatively, DNS query cache 512 may include publicly available systems that log results of DNS queries. In some embodiments, the systems and methods described herein may query multiple DNS query caches, including public and private sources of information.

Returning to FIG. 5, security provider 510 may issue request 208 to receiving module 104. Receiving module 104 may then prompt querying module 106 to begin collecting DNS records and cached query logs from DNS server 206 and DNS query cache 512. Querying module 106 may retrieve DNS record 214 from database 212 of DNS server 206, and retrieve DNS record 514 from DNS query cache 512. Translating module 508 may translate DNS records 214 and 514 into map entries 216 and 516, as will be described in greater detail below.

Returning to FIG. 3 at step 308, one or more of the systems described herein may generate a service map that matches each network resource used by the domain to a service type of the network resource and a service provider that provides the network resource. For example, generating module 110 may, as part of computing system 202 in FIG. 2, generate service map 120 that matches each network 204 resource used by domain 210 to the service type of network 204 resource and the service provider that provides network 204 resource.

Generating module 110 may generate service map 120 based at least in part on map entries generated for each network resource identified in the collection of records retrieved by querying module 106 for domain 210. Each map entry may list a service provider in association with service types of network resources maintained by that service provider. For example, a map entry for AMAZON ELASTIC LOAD BALANCING SERVICES may read "(CLOUD: IAAS) AMAZON ELB," indicating that AMAZON ELASTIC LOAD BALANCING SERVICES provides cloud-based IAAS to domain 210. In embodiments where the systems and methods described herein collect and translate many DNS records related to many different domains simultaneously (e.g., as part of a wide-band risk assessment, or as part of running an overall risk assessment of a network as a whole), each map entry generated from a DNS record associated with domain 210 may include information that indicates that the map entry is associated with domain 210. Generating module 110 may read this information from the map entry and add each map entry related to domain 210 to service map 120.

In some embodiments, generating module 110 may generate more than one service map for domain 210. In these embodiments, generating module 110 may generate a series of service maps for domain 210 over a period of time. For example, generating module 110 may periodically generate service maps for domain 210 according to a predetermined schedule. As a specific example, generating module 110 may generate a service map for domain 210 on a yearly basis to assist insurance providers, security providers, and/or administrators of domain 210 to evaluate whether domain 210 is at risk of failures should specific service providers become compromised. As will be described in greater detail below, other elements of modules 102 may use this series of service maps to calculate risk trajectories and/or perform other sorts of risk assessment for domain 210.

Generating module 110 may additionally or alternatively generate service maps for multiple domains. In these embodiments, generating module 110 may generate service maps for each domain in a set of domains under analysis. For example, and as described above, the systems and methods described herein may use the AMAZON ALEXA 1M dataset of domains as an input. In this example, generating module 110 may generate a service map for each domain in the AMAZON ALEXA 1M dataset. As will be described in greater detail below, one or more of modules 102 may use this collection of service maps to evaluate the importance (and therefore risk of insuring and/or securing) a particular service provider to the domains that were used as an input.

In further embodiments, the systems and methods described herein may examine subdomains of domain 210. In these embodiments, receiving module 104 may treat a subdomain of domain 210 as an additional input and prompt querying module 106 to retrieve DNS records associated with the subdomain. Because the subdomain is fully encompassed by domain 210, generating module 110 may include the network resources that enable the subdomain to service map 120 rather than generating a new service map for the subdomain. Additionally or alternatively, generating module 110 may generate a new service map for the subdomain to enable individuals and/or organizations to analyze risks associated with different subdomains of domain 210.

Moreover, the systems and methods described herein may chart upstream dependencies from domain 210. In other words, one or more of modules 102 may use a service provider to domain 210 as an input to retrieve records related to that service provider and identify systems that enable the service provider to provide services to domain 210. For example and with returning reference to FIG. 4, the systems and methods described herein may identify underlying domain 408 as a service provider to domain 210. The systems and methods described herein may then use underlying domain 408 as an input. In some embodiments, the systems and methods described herein may generate a new service map for underlying domain 408. Additionally or alternatively, the systems and methods described herein may translate records associated with underlying domain 408 into map entries for the service map associated with domain 210, as failures in underlying domain 408 may directly affect domain 210. Modules 102 may recursively examine upstream service providers in this fashion until a threshold depth has been reached, (e.g., two levels upstream from domain 210), a threshold number of service providers have been identified, a processing time has been exceeded, etc.

Generating module 110 may translate information contained within a record as part of forming the associations within service map 120, and may perform a variety of actions as part of translating a record. For example, some DNS records may refer to a FQDN. In these examples, generating module 110 may truncate the FQDN to indicate the highest-level domain that also uniquely identifies the service provider that manages the network resource. For example, generating module 110 may truncate the FQDN "s3.aws.amazon.com" to "amazon.com," thereby identifying AMAZON as the service provider. Generating module 110 may leverage publicly available information such as the set of public domains from PUBLICSUFFIX.ORG to determine which domain components are unique to a service provider. For example, ".com" is a public top-level domain and therefore does not uniquely identify a host or service provider. Generating module 110 may additionally or alternatively use custom rulesets defined by an administrator that manages the execution of generating module 110.

Some DNS records may refer to an IP address rather than an easily-translated domain name. In these situations, generating module 110 may convert the IP address into a corresponding domain name using, for example, a reverse-DNS record associated with the IP address. Generating module 110 may then translate the domain name as described above.

In some embodiments, generating module 110 may attempt to uncover an underlying service provider that might otherwise be masked by a chain of dependencies. For example, an MX record for a domain might indicate a particular host as providing mail exchange services, but that host might purchase content delivery services from another service provider. Accordingly, generating module 110 may identify a domain associated with a DNS record, convert that domain into a corresponding IP address (e.g., by retrieving a DNS A record associated with the domain), then convert the IP address into an additional domain name. In some examples, generating module 110 may use a reverse-DNS search to identify another domain associated with the discovered IP address. Converting a domain into an IP address and back again in this fashion may accordingly reveal underlying service providers that enable the functionality of domain 210 that might fail to be uncovered using traditional risk-analysis methods.

Furthermore, generating module 110 may associate the service provider identified in the manner described above with a service type of the network resources offered by the service provider. Generating module 110 may create this association based on the type of record that generating module 110 used to identify the service provider. For example, a service provider identified from a CNAME record is likely to offer content-delivery network (CDN) services. Similarly, a service provider identified from an MX record is likely to offer mail-exchange services. Unfortunately, generating module 110 may be unable to identify the services provided by certain identified service providers. For example, generating module 110 may identify a service provider identified based on converting a domain into an IP address and back again. However, in some examples, generating module 110 may be unable to directly identify the service provided by a newly discovered service provider, as that service provider may provide a service to the domain in the record that is different from the service that the domain in the record provides to domain 210.

Some records, such as TXT records, may contain information that identifies service providers but contain insufficient information for generating module 110 to assign a service type to the identified service provider. Unfortunately, these records may not be directly associated with a function of domain 210 (e.g., a TXT record may contain any unformatted text string), causing generating module 110 to be unable to identify the service type fulfilled by the identified service provider. Even further, in some examples generating module 110 may be unable to recognize and/or categorize certain records. In these situations, generating module 110 may determine that the record indicates a reference to a network resource with an unknown service type and associate the identified service type with an identifier indicating the service type as "unknown." Other elements of modules 102 may compile a list of uncategorized service providers, as will be described in greater detail below.

Additionally or alternatively, generating module 110 may use pre-established rules to translate a DNS record. For example, generating module 110 may use a rule that maps the hostname of a particular service provider to a name of the service provider. Translating hostnames into organization and/or service provider names may enable end-users to more readily identify service providers. Similarly, generating module 110 may use pre-established rules that correlate certain hostnames to specific service types, even if the service type may be unclear from the information contained in the DNS record. For example, generating module 110 may be aware that domains and subdomains ending in ".elb.amazonaws.com" map to the AMAZON ELASTIC LOAD BALANCING service, and categorize DNS records containing those domains and subdomains as representing links to network resources provided by AMAZON ELASTIC LOAD BALANCING.

Figure 6:
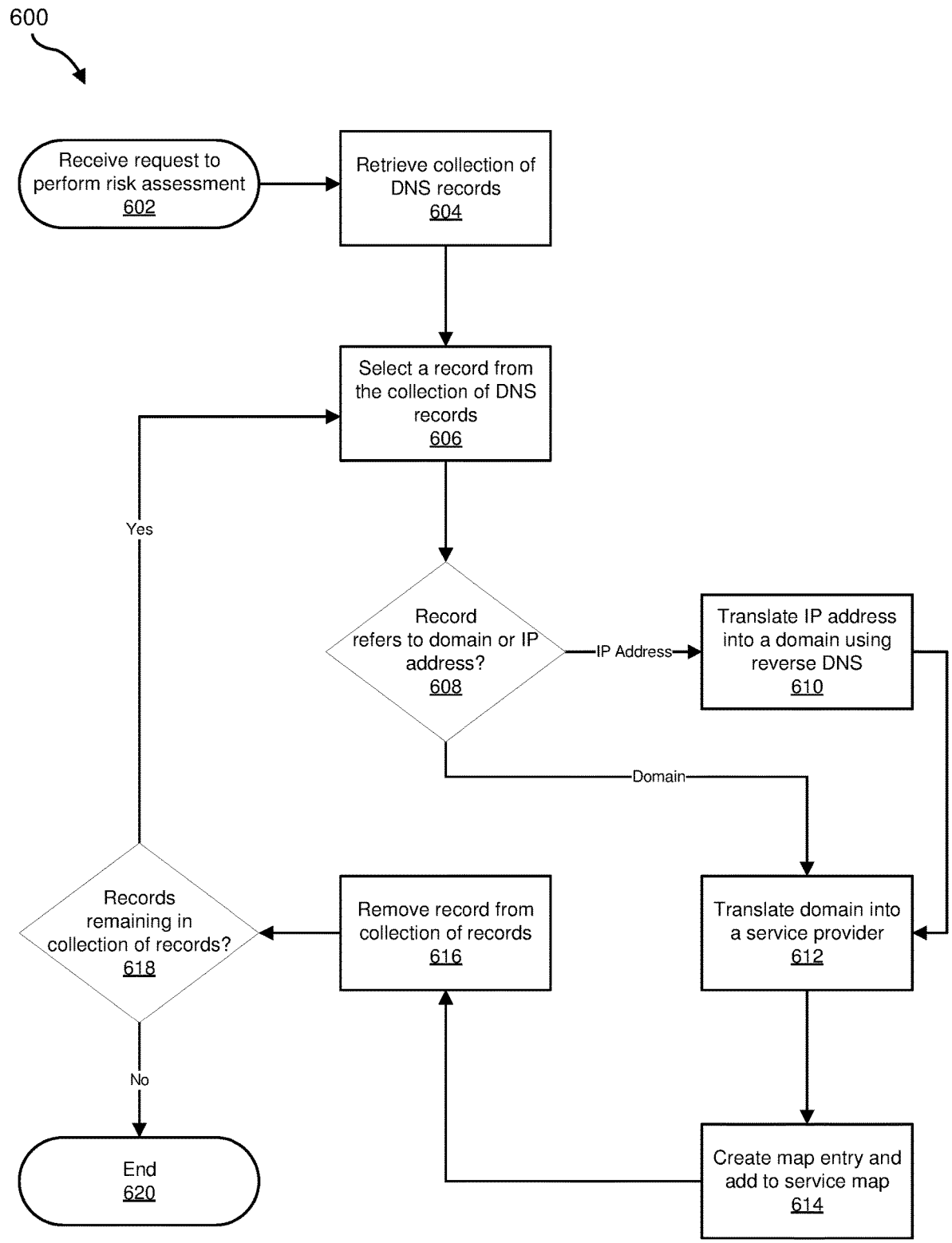
FIG. 6 is a flow diagram of an example method for constructing a service map from a collection of records.

A flow diagram of an example method 600 for constructing a service map is shown in FIG. 6. At step 602 in FIG. 6, receiving module 104 may receive request 208 to perform a risk assessment on domain 210. At step 604 of method 600, querying module 106 may retrieve a collection of DNS records and/or DNS query logs for processing into map entries. At step 606, generating module 110 may select a record from the collection of DNS records and/or select a DNS record extracted from a DNS query log. At step 608 in method 600, generating module 110 may determine if the selected record refers to a domain or hostname, or if the selected record refers to an IP address. If the selected record refers to a domain name or hostname, generating module 110 may be able to directly translate that domain name or hostname into a service provider at step 612. If the selected record instead refers to an IP address, generating module 110 may first proceed to step 610 and translate the IP into a domain or hostname using a reverse-DNS lookup before translating the domain or hostname into a service provider at step 612.

Once the domain or hostname has been translated into a service provider, generating module 110 may use the translated information to generate a service map. At step 614 of method 600, generating module 110 may, as described in greater detail above, generate a map entry that associates the service provider identified in the record with a service type and/or any other relevant information. Generating module 110 may then add this map entry to the service map for domain 210. At step 616, modules 102 may have completely processed the selected record and ensured that the selected record is properly represented in the service map. Accordingly, one or more of modules 102 may, at step 616, remove the selected record from the collection of records. At step 618, if no more records remain to in the collection of records to be processed, the service map generation process may end at step 620. If, however, the collection of records contains records that have not yet been processed, one or more of modules 102 may return to step 606 and select a new record from the collection of records for processing.

At step 310 in FIG. 3, one or more of the systems described herein may perform the risk assessment of the domain based at least in part on the service map. For example, performing module 112 may, as part of computing system 202 in FIG. 2, perform the risk assessment of domain 210 based at least in part on service map 120.

Performing module 112 may perform the risk assessment in a variety of ways. In general, performing module 112 may examine service map 120 to determine which services are associated with each service provider used by domain 210. Performing module 112 may accomplish this task by examining each map entry in service map 120 and identifying each map entry that is associated with a given provider and performing an aggregate evaluation on the collection of map entries to determine which functions of domain 210 would become unavailable in the event that the service provider fails. In embodiments where service map 120 indicates redundant service providers for a particular service (e.g., domains may be represented on more than one name server, and thus have multiple NS records associated with them), performing module 112 may calculate a probability that proper functioning of domain 210 will be impacted by a service failure in a service provider. Performing module 112 may use any suitable mathematical analysis to calculate this probability; in general, however, greater redundancy in service providers and/or a wider distribution of service providers (i.e., domain 210 does not rely on a single service provider for most or all functions) may generally result in a lower probability of domain 210 experiencing a failure.

Performing module 112 may account for a variety of factors when performing the risk assessment of domain 210. For example, performing module 112 may utilize data indicating the number of service failures experienced by a service provider over a period of time (e.g., experienced two service failures over the course of a year). This data may be provided by a security vendor that tracks uptime of various service providers, gleaned from publicly available cyberattack information, and/or acquired in any other suitable way. Performing module 112 may use this rate-of-failure data when determining potential risks to domain 210, as will be described in greater detail below.

Performing module 112 may also determine the potential impacts of the potential failures. As described in greater detail above, each map entry in service map 120 may include one or more service type indicators associated with a service provider. Performing module 112 may use this association to determine which functions of domain 210 are likely to be affected by a failure in a particular service provider. For example, service map 120 may include map entries indicating that ROCKET WEB SERVICES provides nameserver (NS), mail exchange (MX), and content delivery network (CDN) services for domain 210. In this example, performing module 112 may perform an aggregate evaluation of these map entries and determine that a failure in ROCKET WEB SERVICES might impact the ability of other systems to resolve domain 210 into an IP address (failure in NS services), e-mail associated with domain 210 to send and/or receive messages (failure in MX services), and/or for domain 210 to properly respond to requests for information such as webpages, images, etc. (failure in CDN services).

In embodiments where the systems and methods described herein analyze the dependencies of multiple domains to perform a risk assessment of a particular service provider, performing module 112 may identify domains that utilize a particular network resource provided by a particular service provider. In these embodiments, performing module 112 may perform the risk assessment by evaluating a potential impact on the domains that would result from a service failure in the particular service provider. Performing module 112 may also evaluate how widespread the failure would be, or in other words, evaluate how many systems would be affected by a failure in a service provider to provide a network resource. As described above, a service map or collection of service maps may include map entries that tabulate the number of systems and/or domains that depend on a service provider for a particular service. Performing module 112 may use the information contained within these map entries as part of performing the risk assessment of the service provider. For example, the systems and methods described herein may assess the importance of ROCKET WEB SERVICES to domains in the AMAZON ALEXA 1M set of domains. Generating module 110 may have created a map entry in service map 120 relating to CDN services provided by ROCKET WEB SERVICES and determined that 5000 domains depend on ROCKET WEB SERVICES for CDN services. Performing module 112 may accordingly determine that a failure in ROCKET WEB SERVICES may adversely affect content delivery for those 5000 domains.

Performing module 112 may additionally or alternatively determine an expected rate of failures in service providers that would cause a failure in domain 210. For example, and as described above, performing module 112 may use data indicating how frequently various service providers experience failures and/or the severity of those failures (e.g., how long did the service outage last). In cases where domain 210 uses a single service provider for a particular service type, performing module 112 may simply assume that a failure in that service provider will lead to a corresponding failure of that service in domain 210.

Performing module 112 may perform the risk assessment to determine a likelihood that domain 210 experiences a failure. For example performing module 112 may perform the risk assessment by calculating, based on a collection of service maps, a risk trajectory of domain 210. This risk trajectory may represent a change over time in the potential impacts on domain 210 that would result from a potential failure in a service provider. As described above, generating module 110 may generate a series of service maps over a period of time for domain 210 (e.g., a yearly risk assessment), and performing module 112 may determine risks to domain 210 that would likely result from failures in one or more service providers to domain 210. Furthermore, as may be appreciated from the preceding descriptions, the configuration of domain 210 (i.e., the service providers used by domain 210) may change over time. Changes in the configuration of domain 210 may expose domain 210 to different risks. Performing module 112 may accordingly track changes in the risks presented to domain 210. For example, performing module 112 may, for each service map, calculate a single risk score that represents an overall level of risk that domain 210 will experience a failure within a given timeframe. As a specific example, performing module 112 may predict that domain 210 will experience a 10% chance of at least one serious failure over the course of a year, which later changes to a 5% chance per year after domain 210 receives an updated configuration. Performing module 112 may additionally or alternatively track the severity of failures that domain 210 may suffer. For example, performing module 112 may determine that over-reliance on a single service provider indicates a risk of a total shutdown of domain 210 in the event that the single service provider is compromised.

At step 312 in FIG. 3, one or more of the systems described herein may facilitate a security measure for the domain based at least in part on a result of the risk assessment. For example, facilitating module 114 may, as part of computing system 202 in FIG. 2, facilitate a security measure for domain 210 based at least in part on a result of the risk assessment.

Facilitating module 114 may facilitate a variety of security measures for domain 210. In embodiments where a client requested an assessment of domain 210, facilitating module 114 may provide a result of the above-described risk assessment to the client. For example, facilitating module 114 may generate a risk scorecard for domain 210 that indicates an overall probability that domain 210 will experience a failure within a certain amount of time as well as service providers that are likely to cause those failures. Facilitating module 114 may then provide the risk scorecard to the client.

In some embodiments, a client, insurance organization, and/or security vendor may seek to perform their own analysis of the services used by domain 210. In these embodiments, facilitating module 114 may provide service map 120 to the requesting entity.

Regardless of the information and/or the format of the information that facilitating module 114 provides to the entity that requested the risk assessment, facilitating module 114 may enable the requesting entity to protect the domain against service outages caused by failures in one or more service providers to the domain. The requesting entity may then use this information as part of providing insurance to domain 210, providing security services to domain 210, etc.

In some examples, facilitating module 114 may facilitate categorization of previously uncategorized service providers. For example, facilitating module 114 may identify map entries within service map 120 that correspond to service providers that provide an uncategorized network resource. Facilitating module 114 may then compile these entries into a list of uncategorized service providers based at least in part on identifying DNS records and/or map entries that correspond to network resources that have been categorized with a service type of unknown. Facilitating module 114 may facilitate categorization of these service providers and/or services by providing the list of uncategorized service providers to an administrator of domain 210, a security vendor, an insurance company, and/or any other operator of the systems and methods described herein, thereby enabling the administrator to categorize each service provider in the list of uncategorized service providers.

Facilitating module 114 may additionally or alternatively take a variety of automated actions to assist business continuity systems, security systems, and/or other systems in maintaining domain 210. For example, facilitating module 114 may automatically deliver a list of services that are at risk of failure to an administrator of domain 210. Additionally or alternatively, facilitating module 114 may prompt a failure management system to automatically activate a mirror or other fallback service of domain 210 in response to facilitating module 114 determining that the original version of domain 210 is at high risk of failure. As a further example, facilitating module 114 may automatically provide a periodic service report to an insurance company that insures domain 210 in the event of a service failure, thereby enabling the insurance company to automatically adjust insurance rates for domain 210 as estimated risk changes over time.

As described above in connection with method 300 in FIG. 3, a risk assessment system may map out service dependencies that allow a network domain to function. By retrieving and translating DNS queries and/or cached query logs related to the domain, the systems and methods described may be able to determine how upstream failures are likely to affect the domain under evaluation. In embodiments where the systems and methods described above evaluate many domains, similar analysis techniques may be applied to determine how a failure in a particular service provider might affect a larger network, such as the Internet. Service providers, insurance companies, security providers, and other entities may be able to use this data to identify vulnerable points within a network and act to secure, insure, or otherwise protect relevant systems against service failures.

Figure 7:
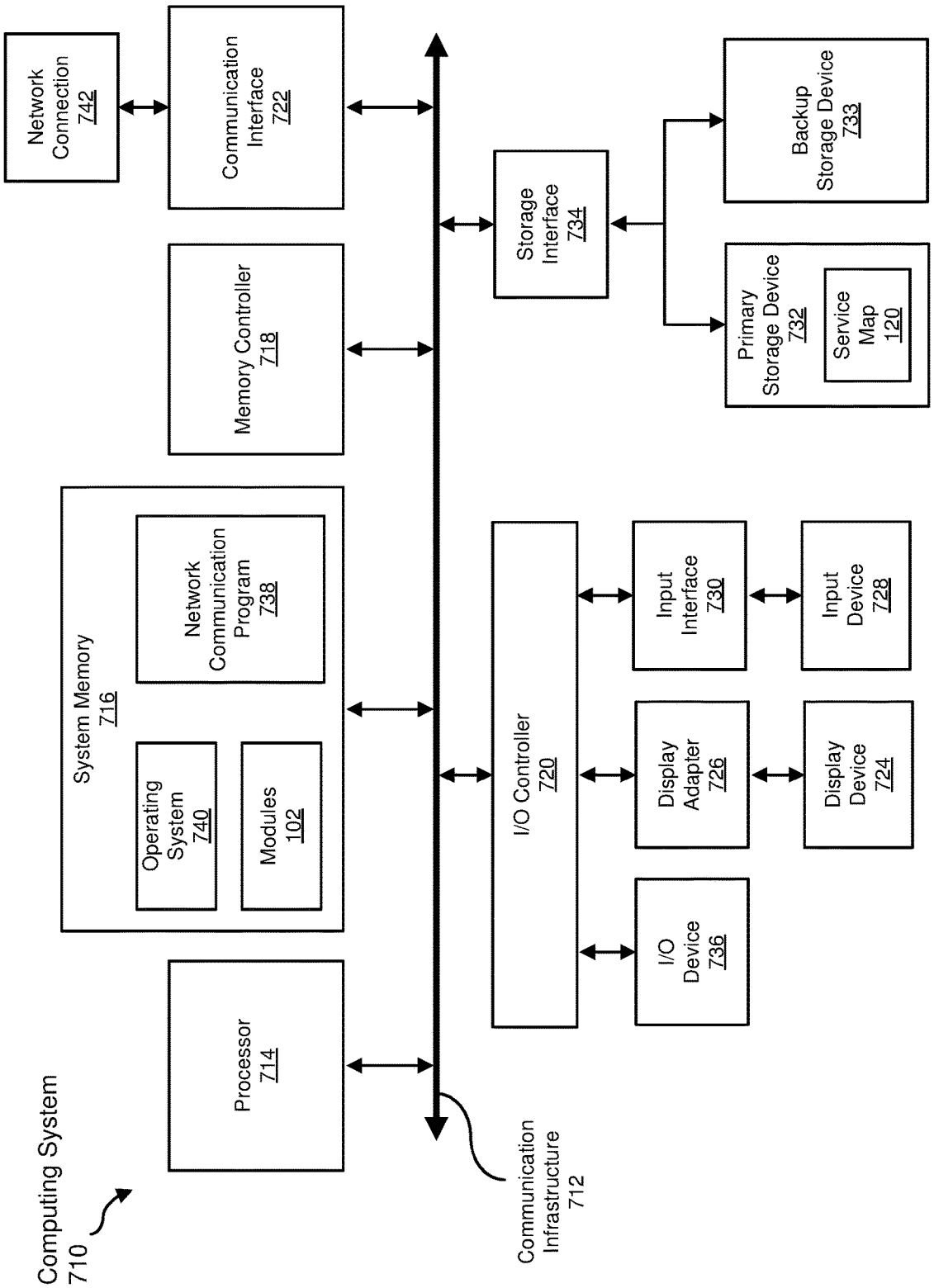
FIG. 7 is a block diagram of an example computing system capable of implementing one or more of the embodiments described and/or illustrated herein.

FIG. 7 is a block diagram of an example computing system 710 capable of implementing one or more of the embodiments described and/or illustrated herein. For example, all or a portion of computing system 710 may perform and/or be a means for performing, either alone or in combination with other elements, one or more of the steps described herein (such as one or more of the steps illustrated in FIG. 3). All or a portion of computing system 710 may also perform and/or be a means for performing any other steps, methods, or processes described and/or illustrated herein.

Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may include at least one processor 714 and a system memory 716.

Processor 714 generally represents any type or form of physical processing unit (e.g., a hardware-implemented central processing unit) capable of processing data or interpreting and executing instructions. In certain embodiments, processor 714 may receive instructions from a software application or module. These instructions may cause processor 714 to perform the functions of one or more of the example embodiments described and/or illustrated herein.

System memory 716 generally represents any type or form of volatile or non-volatile storage device or medium capable of storing data and/or other computer-readable instructions. Examples of system memory 716 include, without limitation, Random Access Memory (RAM), Read Only Memory (ROM), flash memory, or any other suitable memory device. Although not required, in certain embodiments computing system 710 may include both a volatile memory unit (such as, for example, system memory 716) and a non-volatile storage device (such as, for example, primary storage device 732, as described in detail below). In one example, one or more of modules 102 from FIG. 1 may be loaded into system memory 716.

In some examples, system memory 716 may store and/or load an operating system 740 for execution by processor 714. In one example, operating system 740 may include and/or represent software that manages computer hardware and software resources and/or provides common services to computer programs and/or applications on computing system 710. Examples of operating system 740 include, without limitation, LINUX, JUNOS, MICROSOFT WINDOWS, WINDOWS MOBILE, MAC OS, APPLE'S 10S, UNIX, GOOGLE CHROME OS, GOOGLE'S ANDROID, SOLARIS, variations of one or more of the same, and/or any other suitable operating system.

In certain embodiments, example computing system 710 may also include one or more components or elements in addition to processor 714 and system memory 716. For example, as illustrated in FIG. 7, computing system 710 may include a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an Industry Standard Architecture (ISA), Peripheral Component Interconnect (PCI), PCI Express (PCIe), or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734.

As illustrated in FIG. 7, computing system 710 may also include at least one display device 724 coupled to I/O controller 720 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, example computing system 710 may also include at least one input device 728 coupled to I/O controller 720 via an input interface 730. Input device 728 generally represents any type or form of input device capable of providing input, either computer or human generated, to example computing system 710. Examples of input device 728 include, without limitation, a keyboard, a pointing device, a speech recognition device, variations or combinations of one or more of the same, and/or any other input device.

Additionally or alternatively, example computing system 710 may include additional I/O devices. For example, example computing system 710 may include I/O device 736. In this example, I/O device 736 may include and/or represent a user interface that facilitates human interaction with computing system 710. Examples of I/O device 736 include, without limitation, a computer mouse, a keyboard, a monitor, a printer, a modem, a camera, a scanner, a microphone, a touchscreen device, variations or combinations of one or more of the same, and/or any other I/O device.

Communication interface 722 broadly represents any type or form of communication device or adapter capable of facilitating communication between example computing system 710 and one or more additional devices. For example, in certain embodiments communication interface 722 may facilitate communication between computing system 710 and a private or public network including additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution.

In some examples, system memory 716 may store and/or load a network communication program 738 for execution by processor 714. In one example, network communication program 738 may include and/or represent software that enables computing system 710 to establish a network connection 742 with another computing system (not illustrated in FIG. 7) and/or communicate with the other computing system by way of communication interface 722. In this example, network communication program 738 may direct the flow of outgoing traffic that is sent to the other computing system via network connection 742. Additionally or alternatively, network communication program 738 may direct the processing of incoming traffic that is received from the other computing system via network connection 742 in connection with processor 714.

Although not illustrated in this way in FIG. 7, network communication program 738 may alternatively be stored and/or loaded in communication interface 722. For example, network communication program 738 may include and/or represent at least a portion of software and/or firmware that is executed by a processor and/or Application Specific Integrated Circuit (ASIC) incorporated in communication interface 722.

As illustrated in FIG. 7, example computing system 710 may also include a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a solid state drive, a floppy disk drive, a magnetic tape drive, an optical disk drive, a flash drive, or the like. Storage interface 734 generally represents any type or form of interface or device for transferring data between storage devices 732 and 733 and other components of computing system 710. In one example, service map 120 from FIG. 1 may be stored and/or loaded in primary storage device 732.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also include other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 710. All or a portion of the computer program stored on the computer-readable medium may then be stored in system memory 716 and/or various portions of storage devices 732 and 733. When executed by processor 714, a computer program loaded into computing system 710 may cause processor 714 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 710 may be configured as an Application Specific Integrated Circuit (ASIC) adapted to implement one or more of the example embodiments disclosed herein.

Figure 8:
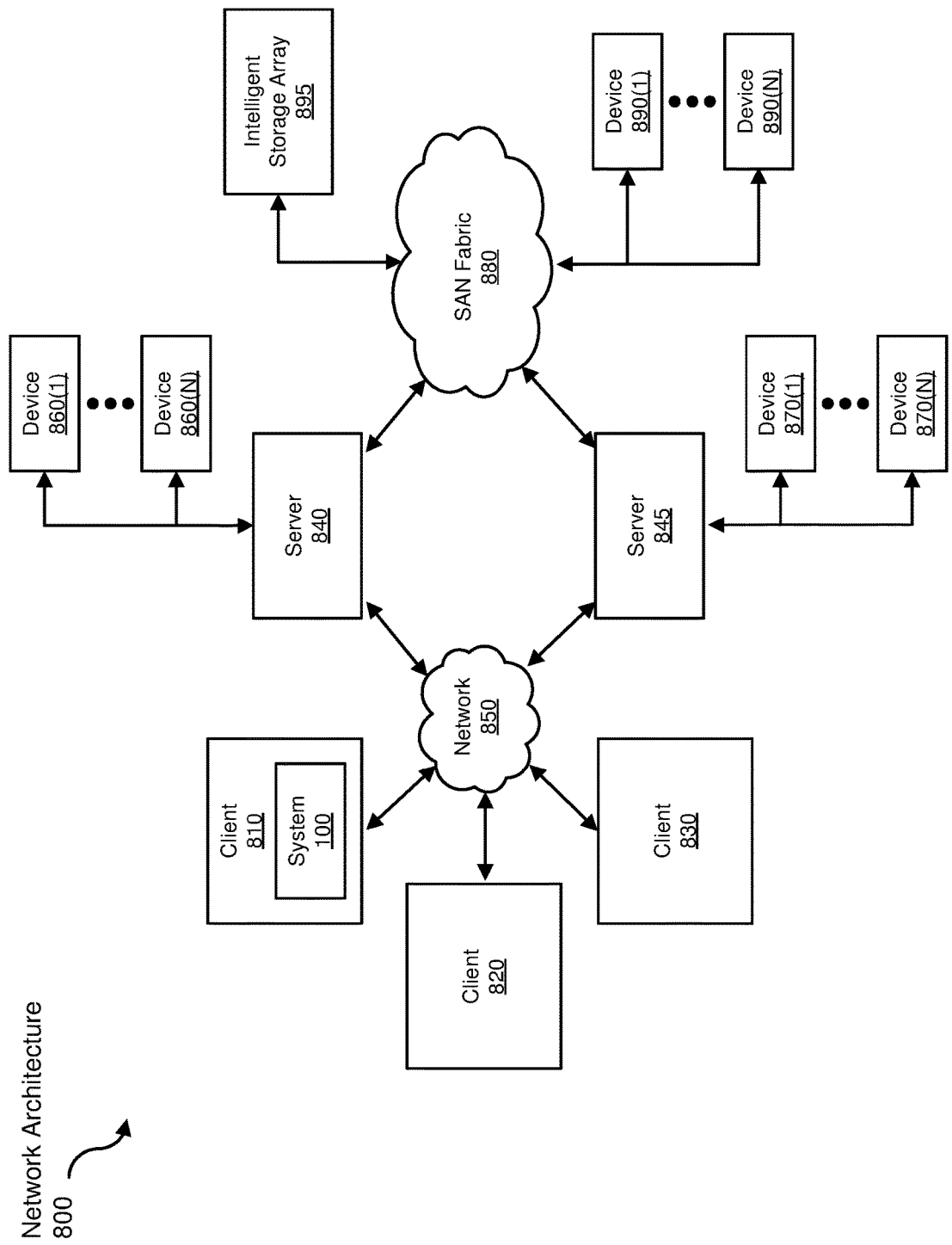
FIG. 8 is a block diagram of an example computing network capable of implementing one or more of the embodiments described and/or illustrated herein.

FIG. 8 is a block diagram of an example network architecture 800 in which client systems 810, 820, and 830 and servers 840 and 845 may be coupled to a network 850. As detailed above, all or a portion of network architecture 800 may perform and/or be a means for performing, either alone or in combination with other elements, one or more of the steps disclosed herein (such as one or more of the steps illustrated in FIG. 3). All or a portion of network architecture 800 may also be used to perform and/or be a means for performing other steps and features set forth in the instant disclosure.

Client systems 810, 820, and 830 generally represent any type or form of computing device or system, such as example computing system 710 in FIG. 7. Similarly, servers 840 and 845 generally represent computing devices or systems, such as application servers or database servers, configured to provide various database services and/or run certain software applications. Network 850 generally represents any telecommunication or computer network including, for example, an intranet, a WAN, a LAN, a PAN, or the Internet. In one example, client systems 810, 820, and/or 830 and/or servers 840 and/or 845 may include all or a portion of system 100 from FIG. 1.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent Network-Attached Storage (NAS) devices configured to communicate with servers 840 and 845 using various protocols, such as Network File System (NFS), Server Message Block (SMB), or Common Internet File System (CIFS).

Servers 840 and 845 may also be connected to a Storage Area Network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to example computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890(1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the example embodiments disclosed herein may also be encoded as a computer program, stored in server 840, run by server 845, and distributed to client systems 810, 820, and 830 over network 850.

As detailed above, computing system 710 and/or one or more components of network architecture 800 may perform and/or be a means for performing, either alone or in combination with other elements, one or more steps of an example method for mapping services utilized by network domains.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules described herein may receive a request to analyze risks to the operation of a domain, retrieve DNS records associated with the domain, transform the DNS records into service map entries, transform the service map entries into a service map for the domain, use a result of the transformations to perform a risk assessment of the domain, provide a result of the risk assessment to an insurance and/or security organization that protects the domain, output a result of the risk assessment to a storage device, present a result of the risk assessment to a user through a user interface, and/or perform an automated security action based on a result of the risk assessment. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including"

and "having" (and their derivatives), as used in the specification and claims, are interchangeable with and have the same meaning as the word "comprising."

What is claimed is:

1. A computer-implemented method for mapping services utilized by network domains, at least a portion of the method being performed by a computing device comprising at least one physical processor, the method comprising:
receiving a request to perform a risk assessment on a network domain, wherein the risk assessment accounts for service provider dependencies that enable functionality of the network domain;
querying a database for a plurality of records associated with the network domain, wherein each record in the plurality of records links to a network resource that enables functionality of the network domain;
generating a service map that matches each network resource to both a service type of the network resource and a service provider that provides the network resource at least in part by translating information included in each record in the plurality of records into a name of the service provider that provides the network resource;
performing, in response to the request and based at least in part on the service map, the risk assessment of the network domain to determine a potential impact on the network domain that results from a potential failure in at least one network resource that enables functionality of the domain; and
facilitating, based at least in part on a result of the risk assessment, a security measure for the network domain that addresses the potential failure in the at least one network resource.

2. The method of claim 1, wherein generating the service map comprises:
determining that the service type of the network resource is unknown; and
categorizing the service type of the network resource as unknown.

3. The method of claim 2, wherein facilitating the security measure comprises:
compiling a list of uncategorized service providers based at least in part on identifying each network resource that has been categorized with a service type of unknown; and
providing the list of uncategorized service providers to an administrator to enable the administrator to categorize each service provider in the list of uncategorized service providers.

4. The method of claim 1, wherein facilitating the security measure comprises providing a result of the risk assessment that includes the service map to a security provider that provides network security services for the network domain to enable the security provider to protect the network domain against service outages caused by failures in one or more service providers to the network domain.

5. The method of claim 1:
further comprising generating a plurality of service maps for the network domain over a period of time; and
wherein performing the risk assessment comprises calculating, based on the plurality of service maps, a risk trajectory of the network domain that represents a change over time in a potential impact on the network domain that results from the potential failure in at least one network resource that enables functionality of the network domain.

6. The method of claim 1:
further comprising generating a plurality of service maps that comprises a corresponding service map for each network domain in a plurality of network domains;
further comprising identifying domains in the plurality of network domains that utilize a particular network resource that is provided by a particular service provider; and
wherein performing the risk assessment comprises performing the risk assessment on the particular service provider to evaluate a potential impact on the plurality of network domains that would result from a service failure in the particular service provider.

7. The method of claim 1:
further comprising querying the public database for a plurality of subdomain records associated with a subdomain of the network domain, wherein each subdomain record links to a subdomain network resource that enables functionality of the subdomain; and
wherein generating the service map further comprises matching each subdomain network resource to a service type of the subdomain network resource and a service provider that provides the subdomain network resource such that each subdomain network resource is represented in the service map of the network domain.

8. The method of claim 1, wherein the public database comprises a plurality of cached results from Domain Name System queries that were performed over a specified period of time.

9. The method of claim 1, wherein the public database comprises a Domain Name System database.

10. The method of claim 1, wherein generating the service map comprises:
identifying an Internet Protocol address associated with a particular record in the plurality of records;
converting the Internet Protocol address into a corresponding network domain; and
matching the network resource to the service type and the service provider based at least in part on the corresponding network domain.

11. The method of claim 1, wherein generating the service map comprises:
identifying a domain name associated with a particular record in the plurality of records;
converting the domain name associated with the particular record into a corresponding Internet Protocol address;
converting the corresponding Internet Protocol address into an additional domain name; and
matching the network resource to the service type and the service provider based at least in part on the additional domain name.

12. The method of claim 1, wherein performing the risk assessment determines a likelihood that the network domain experiences a failure.

13. A system for mapping services utilized by network domains, the system comprising:
a receiving module, stored in memory, that receives a request to perform a risk assessment on a network domain, wherein the risk assessment accounts for service provider dependencies that enable functionality of the network domain;
a querying module, stored in memory, that queries a public database for a plurality of records associated with the network domain, wherein each record in the plurality of records links to a network resource that enables functionality of the network domain;
a generating module, stored in memory, that generates a service map that matches each network resource used by the network domain to both a service type of the network resource and a service provider that provides the network resource at least in part by translating information included in each record in the plurality of records into a name of the service provider that provides the network resource;

a performing module, stored in memory, that performs, in response to the request and based at least in part on the service map, the risk assessment of the network domain to determine a potential impact on the network domain that results from a potential failure in at least one network resource that enables functionality of the domain;

a facilitating module, stored in memory, that facilitates, based at least in part on a result of the risk assessment, a security measure for the network domain that addresses the potential failure in the at least one network resource; and at least one physical processor configured to execute the receiving module, the querying module, the generating module, the performing module, and the facilitating module.

14. The system of claim 13, wherein the generating module:
determines that the service type of the network resource is unknown; and
categorizes the service type of the network resource as unknown.

15. The system of claim 14, wherein the facilitating module:
compiles a list of uncategorized service providers based at least in part on identifying each network resource that has been categorized with a service type of unknown; and
providing the list of uncategorized service providers to an administrator to enable the administrator to categorize each service provider in the list of uncategorized service providers.

16. The system of claim 13, wherein the facilitating module facilitates the security measure by providing a result of the risk assessment that includes the service map to a security provider that provides network security services for the network domain to enable the security provider to protect the network domain against service outages caused by failures in one or more service providers to the network domain.

17. The system of claim 13, wherein:
the generating module generates a plurality of service maps for the network domain over a period of time; and
the performing module performs the risk assessment by calculating, based on the plurality of service maps, a risk trajectory of the network domain that represents a change over time in the potential failure in at least one network resource that enables functionality of the network domain.

18. The system of claim 13, wherein:
the generating module generates a plurality of service maps that comprises a corresponding service map for each network domain in a plurality of network domains;
the performing module identifies network domains in the plurality of network domains that utilize a particular network resource that is provided by a particular service provider; and
the performing module performs the risk assessment by performing the risk assessment on the particular service provider to evaluate a potential impact on the plurality of network domains that would result from a service failure in the particular service provider.

19. The system of claim 13, wherein:
the querying module queries the public database for subdomain records that are associated with a subdomain of the network domain, wherein each subdomain record links to a subdomain network resource that enables functionality of the subdomain;
the generating module generates the service map by matching each subdomain network resource to a service type of the subdomain network resource and a service provider that provides the subdomain network resource.

20. A non-transitory computer-readable medium comprising one or more computer-readable instructions that, when executed by at least one processor of a computing device, cause the computing device to:
receive a request to perform a risk assessment on a network domain, wherein the risk assessment accounts for service provider dependencies that enable functionality of the network domain;
query a public database for a plurality of records associated with the network domain, wherein each record in the plurality of records links to a network resource that enables functionality of the network domain;
generate a service map that matches each network resource used by the network domain to both a service type of the network resource and a service provider that provides the network resource at least in part by translating information included in each record in the plurality of records into a name of the service provider that provides the network resource;
perform, in response to the request and based at least in part on the service map, the risk assessment of the network to determine a potential impact on the network domain that results from a potential failure in at least one network resource that enables functionality of the network domain; and
facilitate, based at least in part on a result of the risk assessment, a security measure for the network domain that addresses the potential failure in the at least one network resource.

* * * * *